United States Patent
Shiu et al.

(10) Patent No.: US 9,791,924 B2
(45) Date of Patent: Oct. 17, 2017

(54) EYE TRACKING WITH MOBILE DEVICE IN A HEAD-MOUNTED DISPLAY

(71) Applicant: MediaTek Inc., Hsinchu (TW)

(72) Inventors: Da-Shan Shiu, Taipei (TW); Kai-Mau Chang, New Taipei (TW); Tsu-Ming Liu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 14/711,606

(22) Filed: May 13, 2015

(65) Prior Publication Data

US 2016/0180591 A1 Jun. 23, 2016

Related U.S. Application Data

(60) Provisional application No. 62/095,883, filed on Dec. 23, 2014.

(51) Int. Cl.
*G02B 27/01* (2006.01)
*G06F 3/01* (2006.01)
*G06F 1/16* (2006.01)
*H04M 1/05* (2006.01)

(52) U.S. Cl.
CPC ........ *G06F 3/013* (2013.01); *G02B 27/0172* (2013.01); *G06F 1/163* (2013.01); *G02B 2027/0138* (2013.01); *G02B 2027/0178* (2013.01); *G02B 2027/0187* (2013.01); *H04M 1/05* (2013.01)

(58) Field of Classification Search
None
See application file for complete search history.

(56) References Cited

U.S. PATENT DOCUMENTS

| | | | | |
|---|---|---|---|---|
| 6,426,755 B1* | 7/2002 | Deering | ............... | G06T 15/503 345/426 |
| 9,250,703 B2* | 2/2016 | Hernandez-Abrego | | G10L 15/26 |
| 2012/0050144 A1* | 3/2012 | Morlock | ............... | G06T 19/006 345/8 |
| 2013/0050833 A1* | 2/2013 | Lewis | ................... | G06T 7/0042 359/630 |
| 2013/0176533 A1* | 7/2013 | Raffle | .................... | A61B 3/113 351/209 |
| 2014/0104692 A1* | 4/2014 | Bickerstaff | ......... | G02B 27/017 359/630 |
| 2014/0152531 A1* | 6/2014 | Murray | ................ | G06F 1/1632 345/8 |

(Continued)

*Primary Examiner* — Ryan M Gray
(74) *Attorney, Agent, or Firm* — Han IP Corporation; Andy M. Han

(57) ABSTRACT

A head-mount display (HMD) and variations thereof are described. An HMD may include a mobile device having a display unit, a camera, a light source and a processing unit that controls operations of the display unit, camera and light source. The processing unit receives data associated with one or more optical images captured by the camera, and renders a visual image displayable by the display unit. The HMD may also include an eyewear piece having a holder, one or more lenses and a reflective unit. The holder is wearable by a user and holds the mobile device in front of eyes of the user. The user can view the display unit through the one or more lenses. The reflective unit reflects an image of at least an eye of the user. The camera is oriented to capture the reflected image of the eye through the reflective unit.

20 Claims, 11 Drawing Sheets

(56) References Cited

U.S. PATENT DOCUMENTS

| | | | |
|---|---|---|---|
| 2015/0084990 A1* | 3/2015 | Laor | G06F 3/011 |
| | | | 345/633 |
| 2015/0103152 A1* | 4/2015 | Qin | H04N 13/044 |
| | | | 348/53 |
| 2016/0007849 A1* | 1/2016 | Krueger | A61B 3/113 |
| | | | 600/301 |
| 2016/0143527 A1* | 5/2016 | MacDougall | A61B 3/113 |
| | | | 345/8 |

* cited by examiner

EYE TRACKING WITH MOBILE DEVICE IN A HEAD-MOUNTED DISPLAY

CROSS REFERENCE TO RELATED PATENT APPLICATION

This is a non-provisional patent application that claims the priority benefit of U.S. Provisional Patent Application No. 62/095,883, filed on 23 Dec. 2014 and entitled "Eye Tracking for Mobile Virtual Reality HMD", which is herein incorporated by reference in its entirety.

TECHNICAL FIELD

The inventive concept described herein is generally related to head-mounted display and, more particularly, to techniques with respect to eye tracking using a mobile device in a head-mounted display.

BACKGROUND

Unless otherwise indicated herein, approaches described in this section are not prior art to the claims listed below and are not admitted to be prior art by inclusion in this section.

Virtual reality (VR) is an emerging feature in the consumer market. Typically a head-mounted display (HMD) is a key component of a VR system. In the context of VR, eye tracking (interchangeably referred to as "gaze tracking" herein) is a feature that offers a number of highly valued benefits. An example is that a user may stare at a virtual object to select it. That is, eye tracking allows for a natural mode of user interaction. By taking into account of gaze information, a processor, computing device or system can render graphics in a way to enhance the immersive experience of VR. Eye tracking also enables foveated rendering, which greatly reduces computational latency and energy.

However, there are a number of obstacles in providing eye tracking inside a tight space of a HMD. Specifically, in a given VR HMD, some dedicated cameras and likely some additional computational resources in the form of extra processors, memories, and circuit boards are required. Therefore, it is highly desirable to offer eye tracking at a minimal or even zero cost to the users.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

Figure 1:
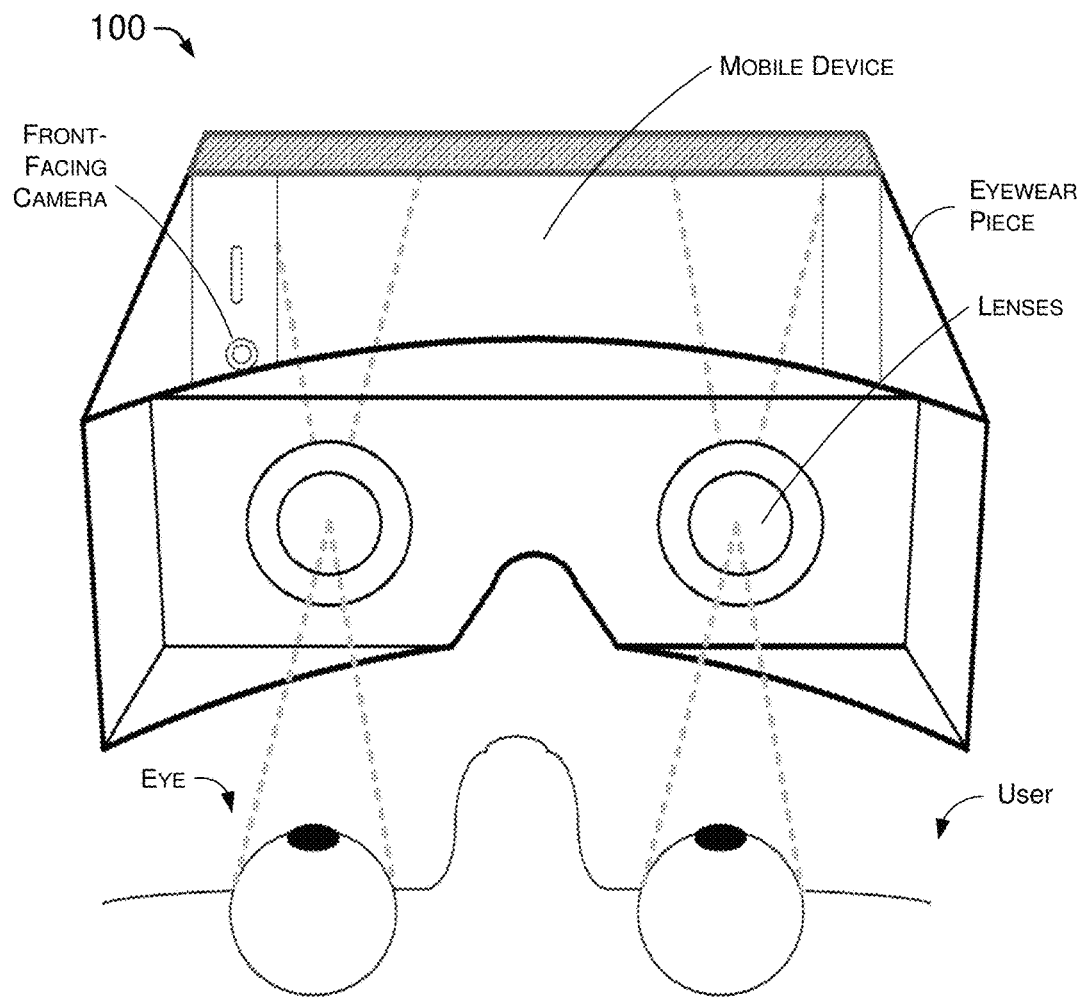
FIG. 1 is a schematic diagram of an example HMD in accordance with an implementation of the present disclosure.

FIG. 1 is a schematic diagram of an example HMD 100 in accordance with an implementation of the present disclosure. While it may be ideal for a consumer to own and operate a dedicated VR HMD, it is possible to temporarily convert a mobile device, e.g., a smartphone or a tablet computer, into a VR HMD using a suitable conversion kit. This would dramatically lower the cost of owning a VR HMD. An example implementation is example HMD 100.

The present disclosure provides a solution in terms of both cost and performance to effectively realize eye tracking for converted VR HMDs. Specifically, according to the present disclosure, a VR HMD may be converted from a mobile device (e.g., a smartphone, tablet computer, phablet or a portable computing device) with suitable display by placing the mobile device in a conversion kit (e.g., one or more converter harnesses). A typical mobile device at present day has one or more front-facing cameras in addition to one or more back-facing cameras. Example usages of a front-facing camera for a user may include taking or otherwise capturing self-portrait photographs as well as holding video calls and video conferences. Additionally, some emerging uses may include gauging focus before taking a shot, sensing a user's attention, providing a pseudo-three dimensional (3D) user interface and the like. Both visible light and infrared (IR) cameras may be found on the front face of a mobile device. Thus, the front facing camera(s), flashlight(s) and considerable computational power of the mobile device may be leveraged to provide high precision, real-time gaze information.

Eye tracking, or gaze tracking, using approaches according to the present disclosure may provide multiple benefits. Firstly, eye tracking using an example HMD of the present disclosure can render the "simulated correct" image, and this provides the greatest improvement over current HMD approaches. Due to lack of gaze tracking system in current HMD approaches, 3D rendering engine usually renders every pixel of a frame at which a user is assumed to be looking. However, this approximation makes every pixel displayed to be equal focused to the human eye. This is an incorrect approach because, given the structure of a typical human eye, the retina sensitivity is not uniform. With gaze information, the rendering engine can be aware of exactly where the user is looking at and therefore can render in real time the correct image for viewing by the user through the example HMD.

Secondly, eye tracking using an example HMD of the present disclosure can make real-time VR alive on a mobile platform. The performance requirement of a processing unit of the mobile device, e.g, a graphics processing unit (GPU), is comparatively lower by directing rendering resources of the processing unit to where the rendering resources are most needed, e.g., where the user is looking. Detailed rendering every pixel displayed by a display unit of the mobile device may be discarded, and this can tremendously lessen the loading on the GPU.

Thirdly, eye tracking using an example HMD of the present disclosure can provide control familiarity as a pointing device. In general people are looking at what they are interested in. Accordingly, it is natural and straightforward to control the operation of the mobile device with gaze information. Besides, it tends to be difficult for a user of a HMD to reach an external pointing device when wearing the HMD as the user cannot actually see the external pointing device or touch the screen.

Additionally, eye tracking using an example HMD of the present disclosure can increase interactivity. Designers of games of VR session can leverage gaze information to create interaction with virtual characters to offer the user more entertaining and socialized user experience.

Implementations of the present disclosure may include a number of configurations, with a select few examples described below. One example configuration may include a head-mounted mobile device holder combined with an inserted mobile device to form a VR HMD. The front-facing camera(s) and flashlight(s) of the mobile device may be leveraged to capture optical images of one or both eyeballs of the user. The images may be transmitted or otherwise sent to a separate VR host for processing. Another example configuration may include a head-mounted mobile device holder combined with an inserted mobile device to form a VR HMD. The front-facing camera(s) and flashlight(s) of the mobile device may be leveraged to take optical images of one or both eyeballs of the user. The images may be analyzed in the mobile device to extract the gaze direction of one or both eyeballs of the user. The gaze direction may then be transmitted or otherwise sent to a separate VR host for processing. A further example configuration may include a head-mounted mobile device holder combined with an inserted mobile device to form a VR HMD. The mobile device may serve as the VR host. The front-facing camera(s) and flashlight(s) may be leveraged to capture optical images of one or both eyeballs of the user. The images may be analyzed in the mobile device to extract the gaze direction of one or both eyeballs of the user. The gaze direction may be applied immediately in the mobile device.

It is noteworthy that there exist a number of challenges associated with implementing gaze tracking by re-using the front-facing camera(s) and flashlight(s) of the mobile device. A first challenge is that a front-facing camera of a mobile device usually has a narrow field of view (FOV). Typically, eyeballs of a user tend to be out of the FOV of the front-facing camera(s) of the mobile device. A second challenge is that there may be optical (e.g., lens of the HMD) and mechanical (e.g., structures of the HMD that seal off ambient light) obstructions in front of and/or around the eyes of the user. A third challenge is that the flashlight(s) of the mobile device may not be capable of shining light on either eyeball of the user due to the aforementioned obstructions.

Figure 2:
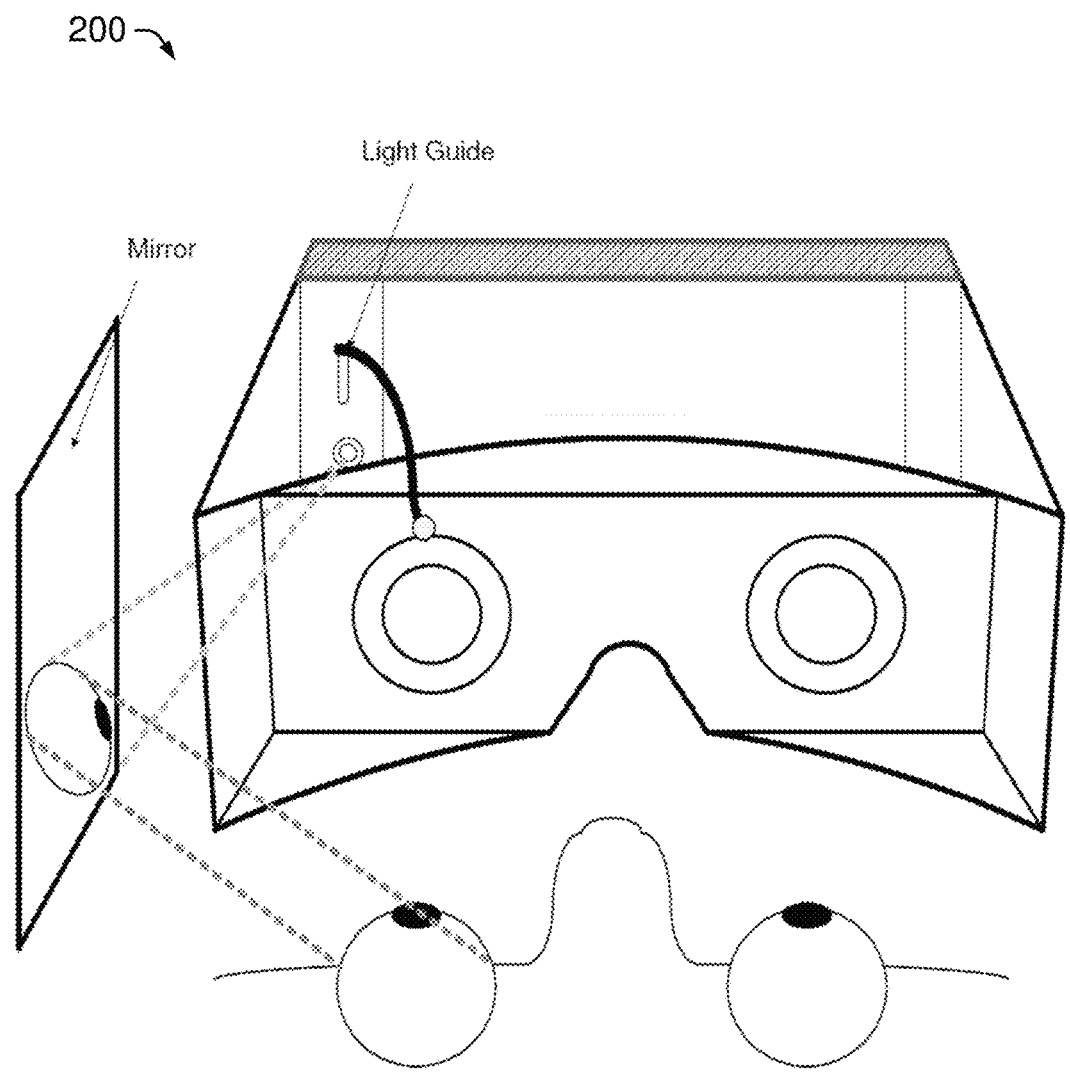
FIG. 2 is a schematic diagram of an example HMD in accordance with another implementation of the present disclosure.
Figure 3:
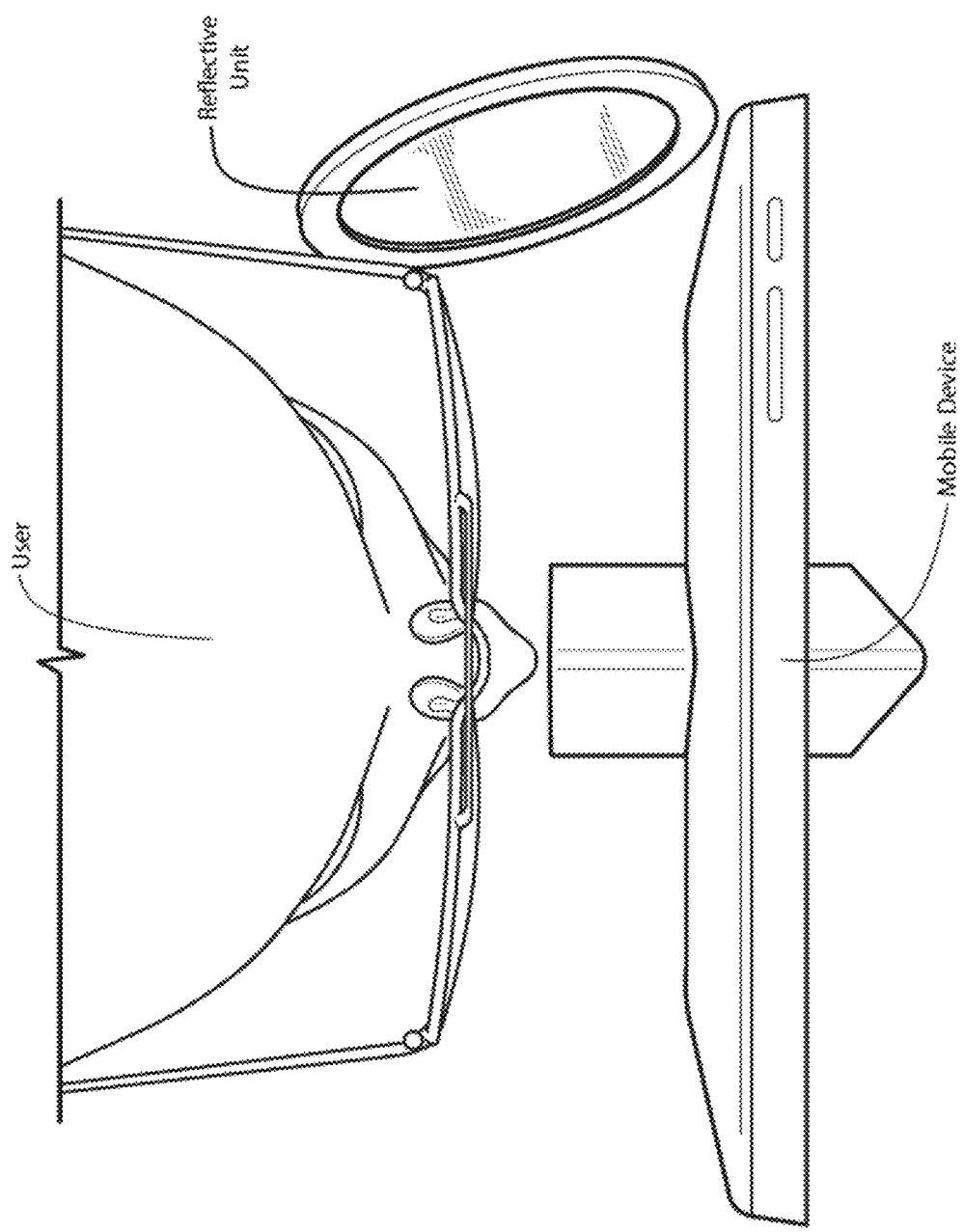
FIG. 3 is a diagram showing how the blocker issue is addressed by an example HMD in accordance with an implementation of the present disclosure.
Figure 4:
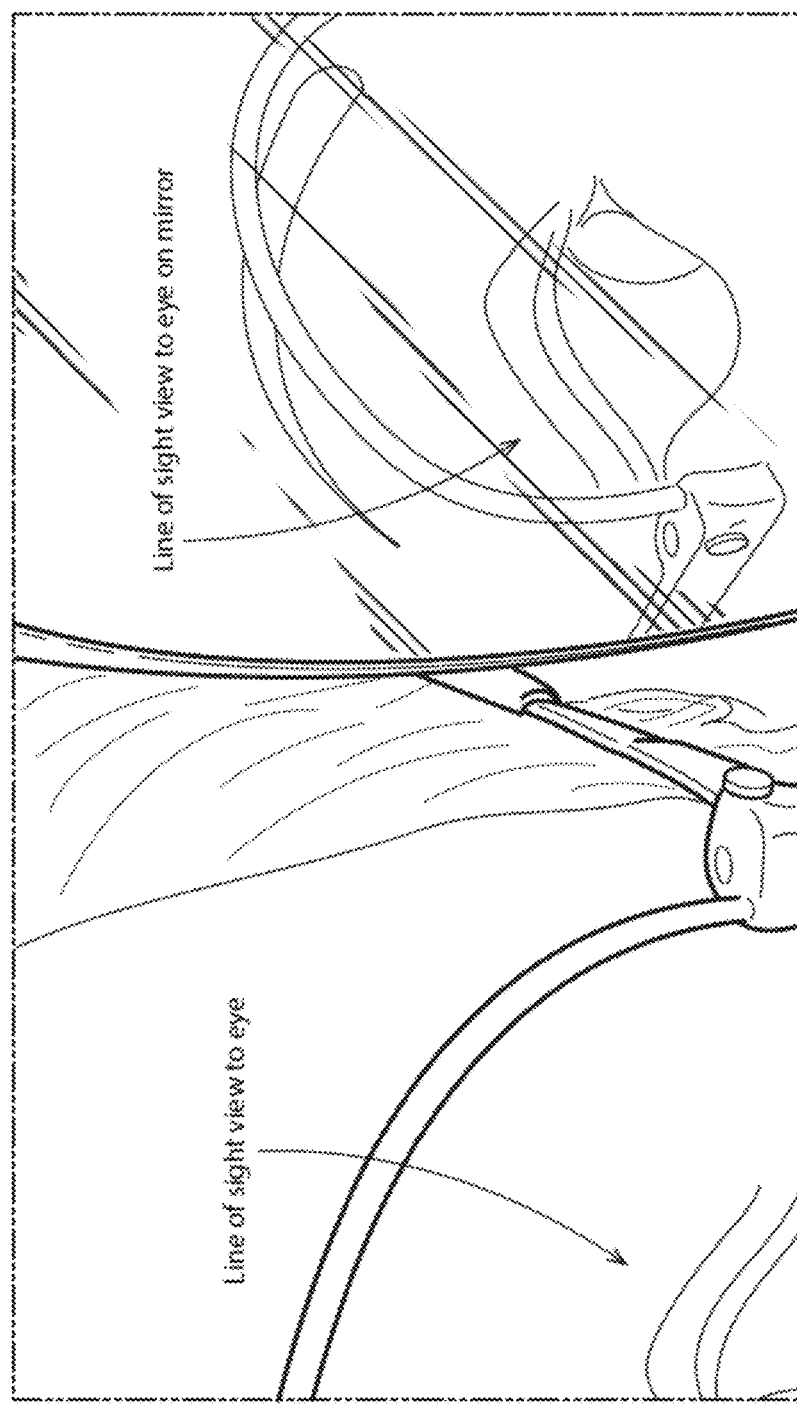
FIG. 4 is a diagram showing an experimental result using an example HMD in accordance with an implementation of the present disclosure.

FIG. 2 is a schematic diagram of an example HMD 200 in accordance with another implementation of the present disclosure. FIG. 3 is a diagram showing how the blocker issue is addressed by an example HMD in accordance with an implementation of the present disclosure. FIG. 4 is a diagram showing an experimental result using an example HMD in accordance with an implementation of the present disclosure. The following description refers to FIG. 2-FIG. 4.

Regarding the first and second challenges mentioned above, the present disclosure provides a novel solution to capture images of an eyeball of a user by utilizing a properly-placed reflective unit, e.g., mirror, as shown in FIG. 3. If a path between the reflective unit and the eyeball is blocked by the HMD for the purpose of seal-off of ambient light, a material used for the part of the HMD used to seal off ambient light may be selected such that infrared is allowed to pass while visible light spectrum is blocked. Regarding the third challenge mentioned above, as the flashlight of a mobile device is typically nearby the front camera thereof, the above-described mechanism may allow the light emitted by the flashlight to reach the target eye. Alternatively or additionally, the HMD may include a light guide structure to provide a point light in front of the target eye to produce a glint as shown in FIG. 2.

The feasibility of implementations of the present disclosure was validated with experiments as shown in FIG. 4. The line of sight path between the front-facing camera and a target eye of the user is both out of the FOV of the front-facing camera and is obstructed. Instead, clear images of the target eye may be captured through an alternative path, made possible by the use of a well-placed reflective unit.

Figure 5:
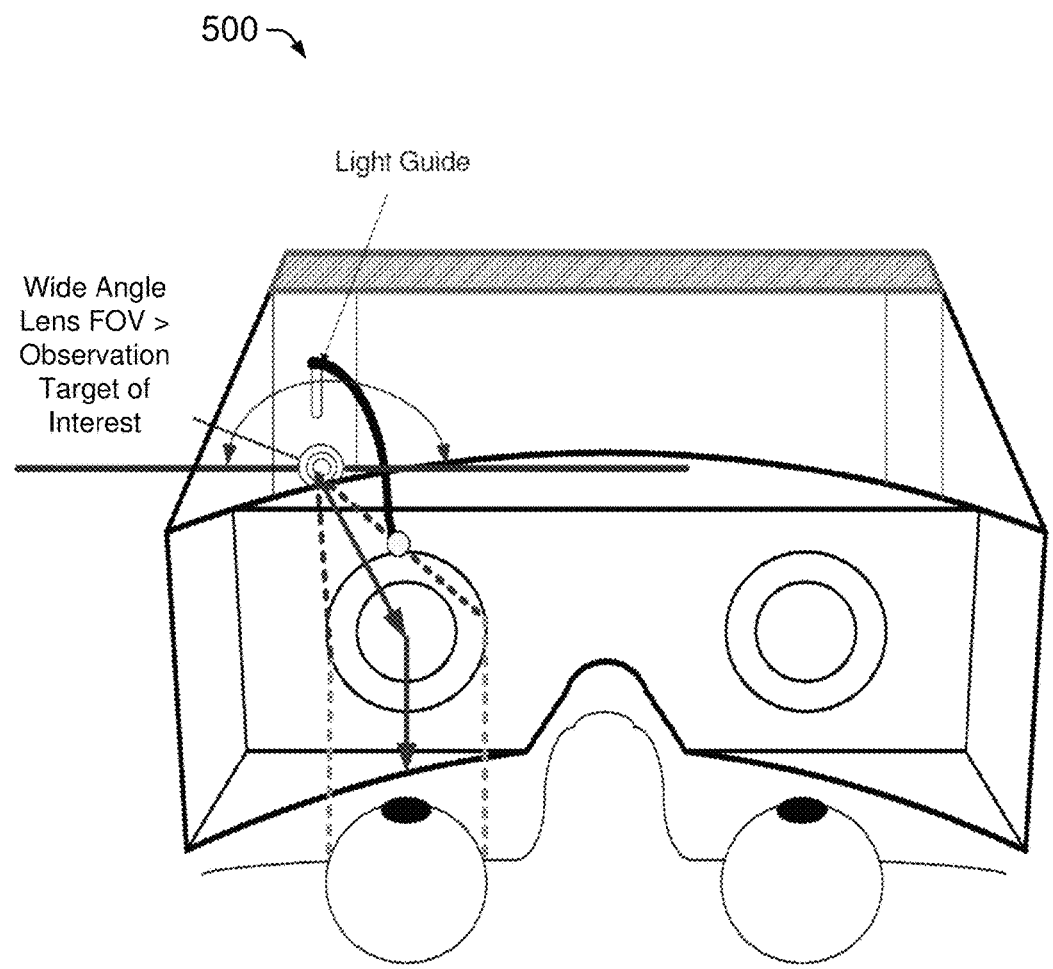
FIG. 5 is a schematic diagram of an example HMD in accordance with yet another implementation of the present disclosure.
Figure 11:
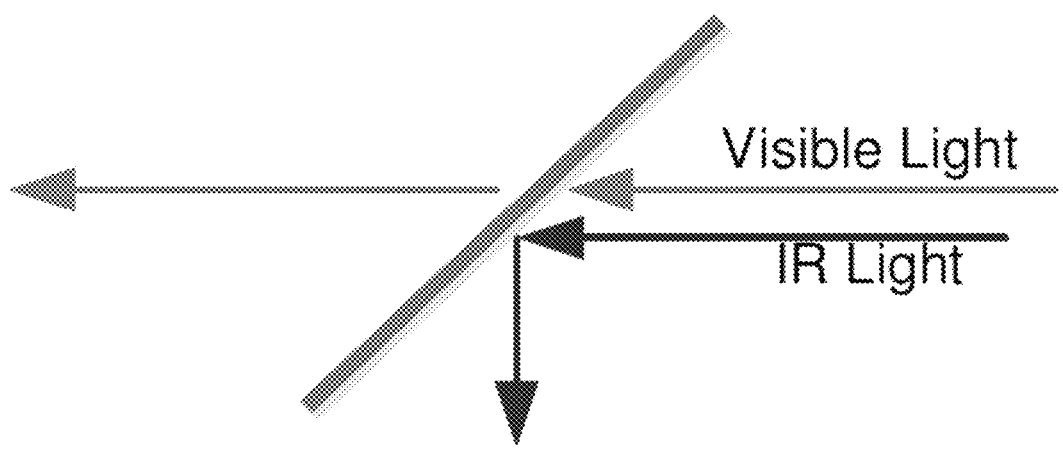
FIG. 11 is a diagram showing a property of a hot mirror.

FIG. 5 is a schematic diagram of an example HMD 500 in accordance with yet another implementation of the present disclosure. FIG. 11 is a diagram showing a property of a hot mirror. The following description refers to FIG. 5 and FIG. 11.

In example HMD 500, the mobile device includes a wide angle lens that allows the FOV of the front-facing camera to be equal to or greater than the observation target of interest, e.g., 90°. The eyeball of the target eye of the user may be observed through the lens of the HMD as shown in FIG. 11. This approach may also address the first and second challenges mentioned above as shown in FIG. 5.

Figure 6:
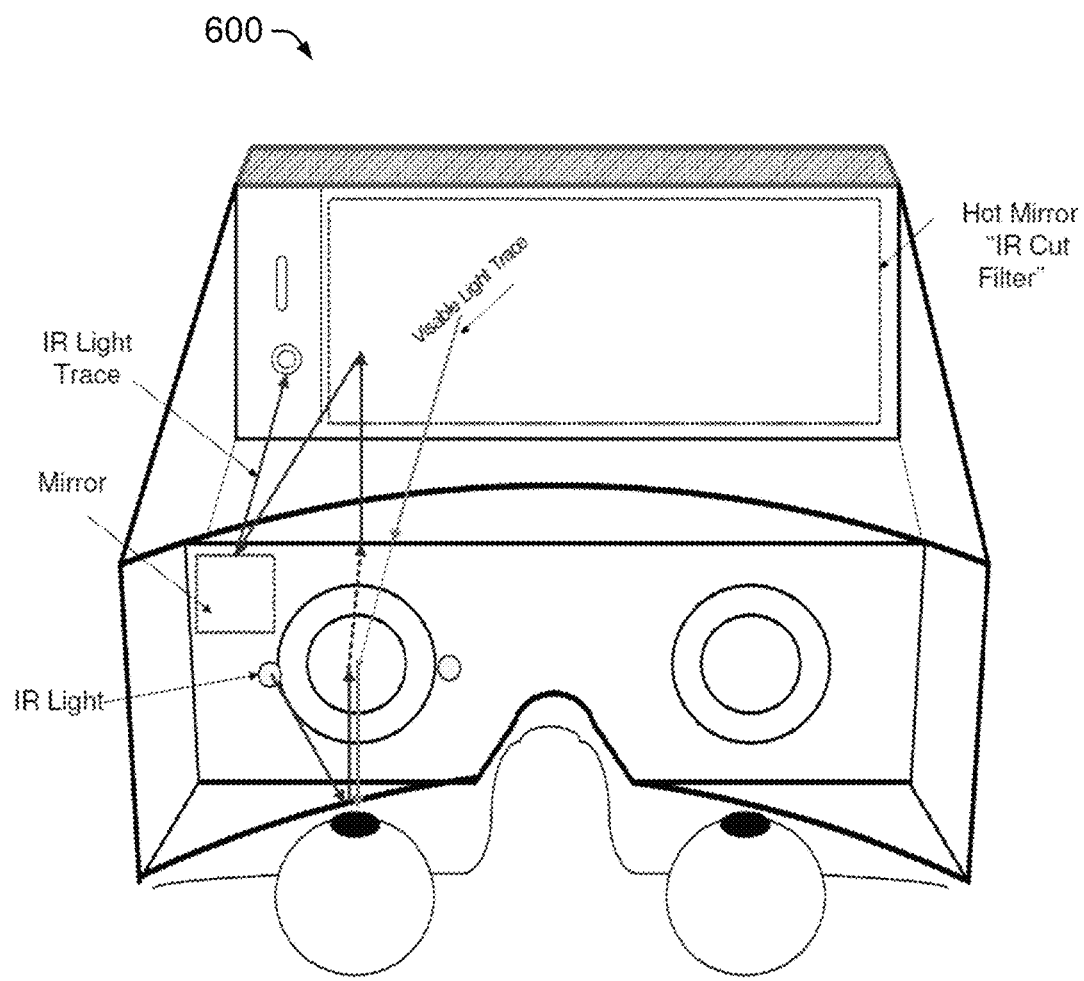
FIG. 6 is a schematic diagram of an example HMD in accordance with still another implementation of the present disclosure.

FIG. 6 is a schematic diagram of an example HMD 600 in accordance with still another implementation of the present disclosure. Example HMD 600 addresses the above-described second challenge. As shown in FIG. 6, a hot mirror is disposed between the display unit of the mobile device and one or more lenses of the HMD. The hot mirror is also disposed between the display unit of the mobile device and a reflective unit (e.g., mirror) installed on the HMD lens bracket. A hot mirror is a specialized dielectric mirror, a dichroic filter, often employed to protect optical systems by reflecting IR light back into a light source, while allowing visible light to pass through. As a result, the image of the eye ball reflected to the front camera of the mobile device may be doubled. That is, when the example HMD is equipped with a first mirror similar to the mirror shown in FIG. 2 and a second mirror similar to the mirror shown in FIG. 6, the image of the eye ball may be reflected to the front camera by the first mirror and also reflected to the front camera by the second mirror. In some implementations, the hot mirror may include multi-layer optical coating thin glass used in general digital camera to reflect IR light, and thus may be referred to as an IR cut filter. The property of the hot mirror is explained with reference to FIG. 11. The multi-layer optical coating creates a band pass filter for light. It allows visible light to pass through without noticeable light degradation and almost reflects 100% of light having wavelength longer than visible light, e.g., IR light.

Figure 7:
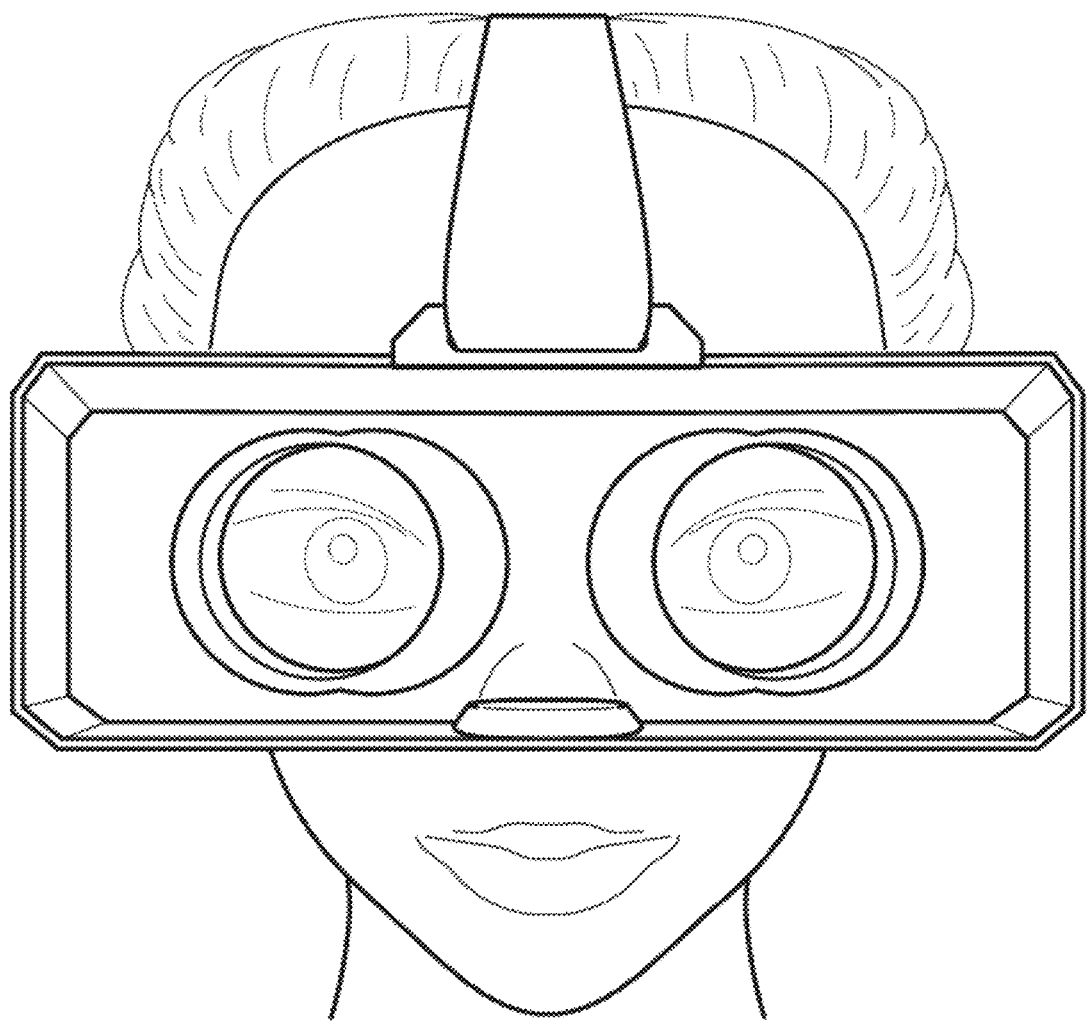
FIG. 7 is a diagram showing a user viewing through one or more lenses of an example HMD in accordance with an implementation of the present disclosure.
Figure 8:
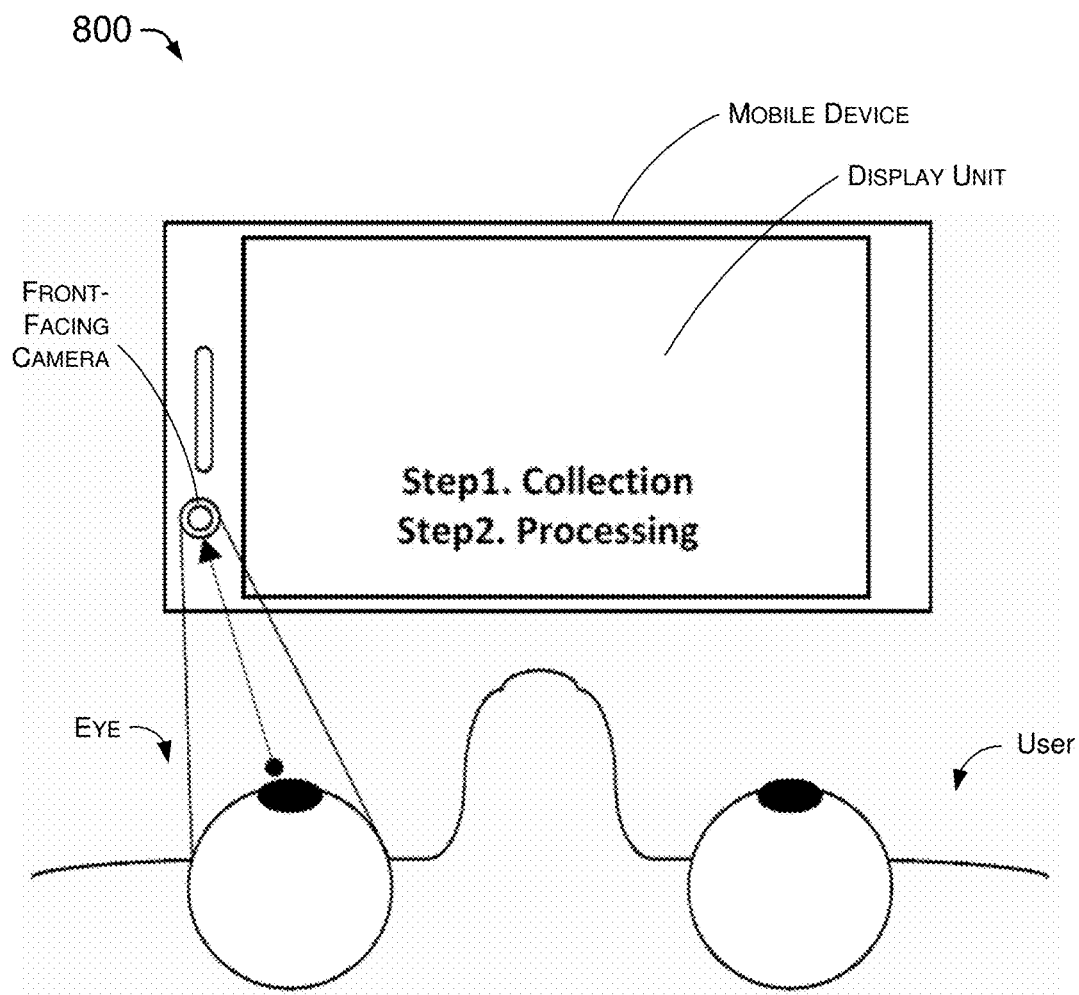
FIG. 8 is a schematic diagram of eye tracking with an example HMD in accordance with an implementation of the present disclosure.

FIG. 7 is a diagram showing a user viewing through one or more lenses of an example HMD in accordance with an implementation of the present disclosure. In particular, FIG. 8 shows an example of an image of a user's eye ball observed through HMD lens. The image may be magnified (distorted) by HMD lens; however, the relation between the gaze direction of the eye of the user and the pupil location of the eye is not distorted. The characteristics of a human eye used in eye tracking remain effective.

As shown in FIG. 2, a mobile device may be converted to a HMD in accordance with the present disclosure. The front camera may, using reflection from the reflective unit, capture an image of the entire eye of the user. The mobile device may utilize images of the eye take from the reflective unit to analyze gaze information pertaining to the eye. The gaze information collected over time may be aggregated.

There exist a number of wearable eyes tracking approaches, including: (1) non-real time approach, shown in FIG. 12; (2) real-time approach with gaze processing unit, shown in FIG. 13; and (3) real-time approach without gaze processing unit, shown in FIG. 14. A brief description of each of the above-listed approaches is provided below.

Figure 12:
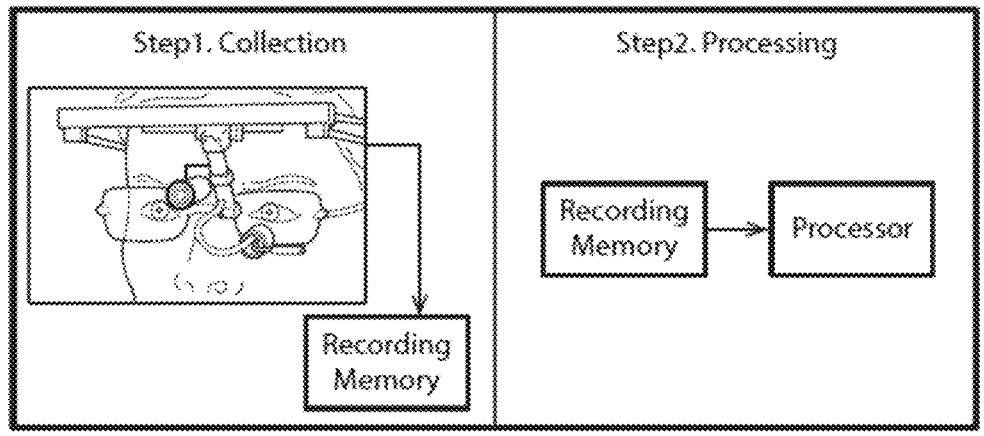
FIG. 12 is a diagram showing an existing approach to eye tracking.

FIG. 12 illustrates a non-real time approach. Under this approach, all gaze information is recorded in a memory device. The gaze information is later processed and aggregated with supported materials, e.g., commercial leaflet and/or website layout. This approach is commonly used for scientific research and commercial testing purposes.

Figure 13:
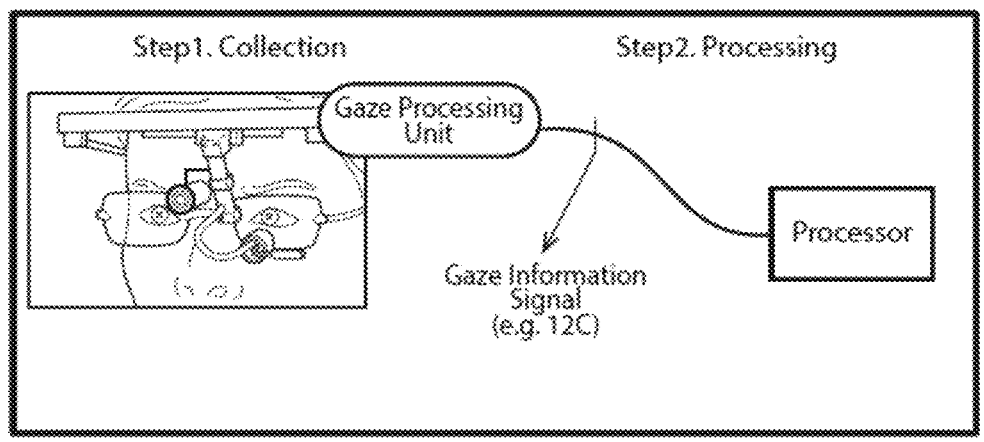
FIG. 13 is a diagram showing another existing approach to eye tracking.

FIG. 13 illustrates a real-time approach with gaze processing unit. Under this approach, gaze information is processed via a processing unit near a camera that performs eye tracking. A feedback signal is provided to the processing unit via a long wire. Although the configuration of this approach is popular at present time, the long wire tends to cause inconvenience for the user.

Figure 14:
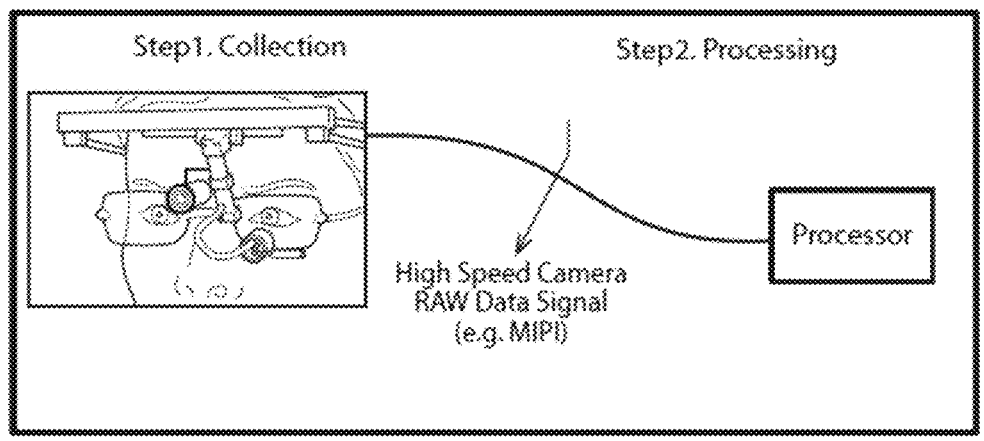
FIG. 14 is a diagram showing yet another existing approach to eye tracking.

FIG. 14 illustrates a real-time approach without gaze processing unit. Under this approach, gaze information is fed back to a processing unit via a high-quality wire for high-speed signals. Without gaze processing unit, the wearable device may save some space and weight. However, the existence of the high-quality wire tends to cause inconvenience for the user. Moreover, the high-quality wire may add cost.

In contrast to the approaches illustrated in FIG. 12-FIG. 14, FIG. 8 illustrates a real-time eye tracking approach 800 without wire in accordance with the present disclosure. Under this novel approach, gaze information may be gathered with a front facing camera that already exists in the mobile device. The gaze information may also be processed and correlated by a processing unit of the mobile device. Accordingly, no additional hardware or wire is needed under this approach.

Benefits provided by implementations of the present disclosure, when compared to existing eye (gaze) tracking approaches, are multi-fold. In particular, compared to existing approaches, implementations of the present disclosure result in lower camera cost and computation cost. Additionally, with implementations of the present disclosure, the user is not required to wear a pair of tracking glasses inside the HMD. Moreover, there is no need for long, high-quality or high-speed wires in implementations of the present disclosure. Furthermore, the conversion kit and the mobile device are de-tethered in implementations of the present disclosure.

As shown in FIG. 2, the present disclosure provides a non-intrusive approach to eye tracking for photo-oculography, video-oculography and/or IR Purkinje image tracking. For illustrative purpose the commonly used IR Purkinje image tracking as an example.

Figure 9:
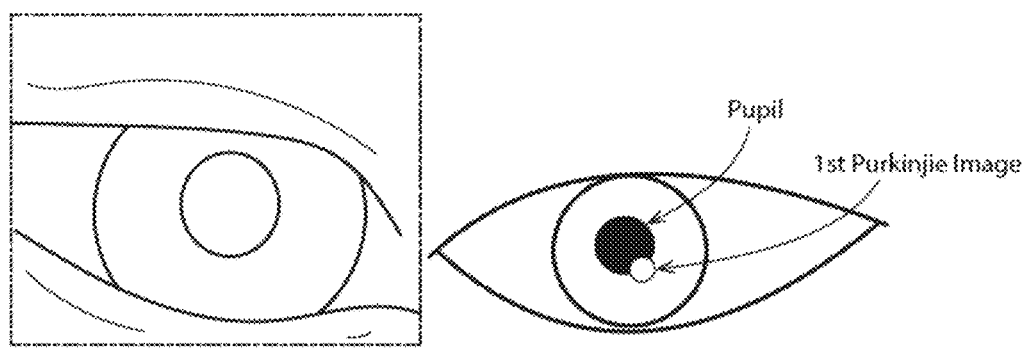
FIG. 9 is a diagram showing a Purkinje image when eye tracking with an example HMD in accordance with an implementation of the present disclosure.
Figure 10:
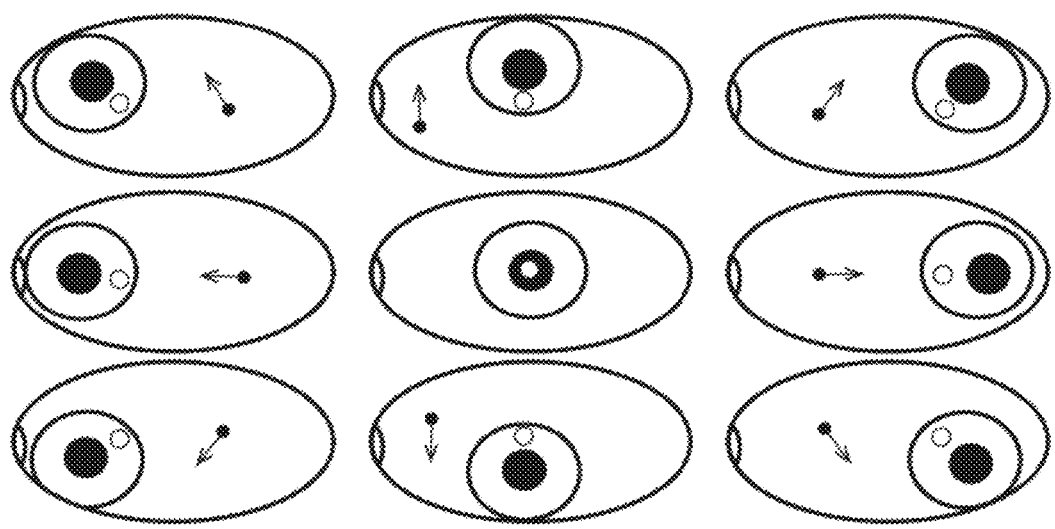
FIG. 10 is a diagram showing pupil locations along with glint when eye tracking with an example HMD in accordance with an implementation of the present disclosure.

FIG. 9 is a diagram showing a Purkinje image when eye tracking with an example HMD in accordance with an implementation of the present disclosure. FIG. 10 is a diagram showing pupil locations along with glint when eye tracking with an example HMD in accordance with an implementation of the present disclosure. The following description refers to FIG. 9 and FIG. 10.

The light source of the example HMD includes an IR light source, and is provided with a simple light guide structure to make a point light in front of the eye to produce a glint, also known as the first Purkinje image as shown in FIG. 9. The front facing camera of the mobile device with a modified IR cut filter can sense visible and near infrared light reflection. With such camera a clear eye image may be obtained with Infrared light reflection.

It is noteworthy that the human eye is not a perfect sphere, but is slightly ovate with bulge at the location of the cornea. In some implementations according to the present disclosure, with the camera and light source location fixed, the eye may be modeled as a sphere using a geometrical method. The location of the pupil of the eye may be extracted or otherwise computed along with relative glint image. FIG. 10 shows nine examples of classified characteristics of Purkinje image models based on which the location at which the eye is looking at may be implied, derived or otherwise computed.

When a user begins to use an example HMD of the present disclosure for an immersive/VR session, the front facing camera of the mobile device is also turned on to a preview mode to gather gaze information for a processing unit of the mobile device to compute the location at which an eye of the user is looking. The gaze information may then be used in a variety of applications for additional benefits. Such applications may include, for example and not limited to, foveated rendering, pointing device and interaction with virtual characters.

Foveated rendering is also commonly referred to as "space variant image rendering" or "gaze contingent image rendering". For foveated rendering, a processing unit of an example HMD of the present disclosure, e.g., a GPU, may render in 100% detail of an area at which the eye of the user is focused. For the rest of the area the processing unit may render with 50% or even 30% force.

In the application of pointing device, implementations of the present disclosure may allow a user to stare at a certain place to cause the immersive/VR application software to pop up a control menu or information board. Furthermore, by using the eye to perform "fixation", "saccades" and "blinking", the user may effectively provide different commands to the mobile device to control the mobile device without actually using any other pointing device.

In the application of interaction with virtual characters, an example HMD of the present disclosure may feedback gaze information for interaction with one or more virtual characters. For example, when the user looks at a virtual character in the game that virtual character may look back to user. Moreover, when the user looks at the eye of a virtual character in the game, that virtual character may smile at or say something to the user.

Highlight of Features

Select features of implementations of the present disclosure are provided below in view of FIG. 1-FIG. 11 as well as description thereof.

In one aspect, an HMD in accordance with the present disclosure may include a mobile device and an eyewear piece. The mobile device may include a display unit, a camera configured to capture one or more optical images, a light source configured to emit a light (e.g., a visible light or an infrared light), and a processing unit configured to control operations of the display unit, the camera and the light source. The processing unit may be also configured to receive data associated with the captured one or more optical images from the camera. The processing unit may be further configured to render a visual image displayable by the display unit. The eyewear piece may be wearable on or around the forehead of a user similar to how a pair of goggles are typically worn. The eyewear piece may include a holder, one or more lenses (e.g., one, two, four or six lenses), and a reflective unit. The holder may be wearable by the user (e.g., on or around the forehead thereof) and configured to hold the mobile device in front of eyes of the user. The one or more lenses may be configured to allow the user to view the display unit of the mobile device. The reflective unit may be configured to reflect an image of at least a first eye of the eyes of the user. The camera may be oriented to capture the image of the first eye reflected by the reflective unit.

In at least some implementations, the mobile device may further include a communication unit configured to at least transmit data to a remote computing device. The processing unit may be further configured to provide data associated with the reflected image of the first eye to the remote computing device through the communication unit.

In at least some implementations, the mobile device may further include a communication unit configured to at least transmit data to a remote computing device. The processing unit may be further configured to analyze the reflected image of the first eye to determine a gaze direction of the first eye, and provide data associated with the gaze direction to the remote computing device through the communication unit.

In at least some implementations, the processing unit may be further configured to analyze the reflected image of the first eye to determine a gaze direction of the first eye, and render a revised visual image displayable by the display unit.

In at least some implementations, the processing unit may be further configured to analyze the reflected image of the first eye to determine a gaze direction of the first eye, and perform foveated rendering.

In at least some implementations, the processing unit may be further configured to analyze the reflected image of the first eye to determine a behavior of the first eye, which indicates a command for execution, and execute the command.

In at least some implementations, in executing the command, the processing unit may be configured to execute the command in a context of VR. The visual image may include a VR image.

In at least some implementations, the behavior of the first eye may include one or more of fixation, saccades and blinking.

In at least some implementations, the mobile device may include a smartphone, a tablet computer, a phablet, or a portable computing device.

In at least some implementations, the holder may include a pair of goggles configured to seal off a space between the eyewear piece and a face of the user to prevent an ambient light from entering the space.

In at least some implementations, the reflective unit may be configured to allow the infrared light to pass through and reflect the visible light. Alternatively, the reflective unit may be configured to allow the visible light to pass through and reflect the infrared light.

In at least some implementations, the reflective unit may include one or more mirrors.

In at least some implementations, the reflective unit may include a first mirror and a second mirror. The first mirror may be configured to reflect a first image of the first eye to the camera. The second mirror may be configured to reflect a second image of the first eye to the camera.

In at least some implementations, the HMD may further include a wide angle lens disposed in front of the camera such that an angle of a field of view of the camera through the wide angle lens is large enough to cover the observation target of interest, e.g., at least 90°.

In at least some implementations, the HMD may further include a light guide coupled to the light source. The light guide may be configured to provide a point light in front of the at least one of the eyes of the user to produce a Purkinje image.

In at least some implementations, the camera may be configured to sense the Purkinje image. The processing unit may be configured to determine a location of a pupil of the first eye by tracking a movement of the Purkinje image.

In at least some implementations, the HMD may further include an optical element disposed between the camera and the one or more lenses and between the camera and the reflective unit. The optical element may be configured to reflect the infrared light while allowing the visible light to pass through. In at least some implementations, the optical element may include a hot mirror. In at least some implementations, the camera may be configured to sense visible and near infrared reflections.

In one aspect, an HMD in accordance with the present disclosure may include an eyewear piece that may include a holder, one or more lenses, and a reflective unit. The holder may be wearable by a user and configured to hold a mobile device in front of eyes of the user. The one or more lenses allow the user to view a display unit of the mobile device through the one or more lenses. The reflective unit may be configured to reflect an image of at least a first eye of the eyes of the user.

In at least some implementations, the holder may include a pair of goggles configured to seal off a space between the eyewear piece and a face of the user to prevent an ambient light from entering the space.

In at least some implementations, the reflective unit may be configured to allow an infrared light to pass through and reflect a visible light or alternatively configured to allow the visible light to pass through and reflect the infrared light.

In at least some implementations, the reflective unit may include one or more mirrors.

In at least some implementations, the reflective unit may include a first mirror and a second mirror. The first mirror may be configured to reflect a first image of the first eye to the camera. The second mirror may be configured to reflect a second image of the first eye to the camera.

In at least some implementations, the HMD may also include the mobile device that may include a display unit, a camera, a light source, and a processing unit. The camera may be configured to capture one or more optical images. The camera may be oriented to capture the image of the first eye reflected by the reflective unit. The light source may be configured to emit a light. The processing unit may be configured to control operations of the display unit, the camera and the light source. The processing unit may also be configured to receive data associated with the captured one or more optical images from the camera. The processing unit may be further configured to render a visual image displayable by the display unit.

In at least some implementations, the light emitted by the light source may include a visible light or an infrared light.

In at least some implementations, the mobile device may further include a communication unit configured to at least transmit data to a remote computing device. The processing unit may be further configured to provide data associated with the reflected image of the first eye to the remote computing device through the communication unit.

In at least some implementations, the mobile device may further include a communication unit configured to at least transmit data to a remote computing device. The processing unit may be further configured to perform operations including: analyzing the reflected image of the first eye to determine a gaze direction of the first eye; and providing data associated with the gaze direction to the remote computing device through the communication unit.

In at least some implementations, the processing unit may be further configured to perform operations including: analyzing the reflected image of the first eye to determine a gaze direction of the first eye; and based on the gaze direction, rendering a revised visual image displayable by the display unit.

In at least some implementations, the processing unit may be further configured to perform operations including: analyzing the reflected image of the first eye to determine a gaze direction of the first eye; and based on the gaze direction, performing foveated rendering.

In at least some implementations, the processing unit may be further configured to perform operations including: analyzing the reflected image of the first eye to determine a behavior of the first eye which indicates a command for execution; and executing the command.

In at least some implementations, in executing the command, the processing unit may be configured to execute the command in a context of virtual reality (VR), and the visual image may include a VR image.

In at least some implementations, the behavior of the first eye may include fixation, saccades and blinking.

In at least some implementations, the mobile device may include a smartphone, a tablet computer, a phablet, or a portable computing device.

In at least some implementations, the HMD may further include a wide angle lens disposed in front of the camera such that an angle of a field of view of the camera through the wide angle lens is at least enough to cover an observation target of interest.

In at least some implementations, the HMD may further include a light guide coupled to the light source. The light guide may be configured to provide a point light in front of the at least one of the eyes of the user to produce a Purkinje image.

In at least some implementations, the camera may be configured to sense the Purkinje image. The processing unit may be configured to determine a location of a pupil of the first eye by tracking a movement of the Purkinje image.

In at least some implementations, the HMD may further include an optical element disposed between the camera and the one or more lenses and between the camera and the reflective unit. The optical element may be configured to reflect an infrared light while allowing a visible light to pass through.

In at least some implementations, the optical element may include a hot mirror.

In at least some implementations, the camera may be configured to sense visible and near infrared reflections.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A head-mounted display, comprising:
    an eyewear piece comprising:
        a holder that is wearable by a user and configured to hold a mobile device in front of eyes of the user;
        one or more lenses through which the mobile device is viewable by the user; and
        a reflective unit configured to reflect double images of at least a first eye of the eyes of the user,
        wherein the reflective unit comprises a first mirror, a second mirror and a hot mirror arranged to have the first mirror reflecting a first image of the first eye to a camera on the mobile device and the second mirror reflecting a second image of the first eye to the camera different than the first image such that the camera receives the double images of the first eye,
        wherein the second mirror is disposed on the holder and facing toward the mobile device and away from the user, and
        wherein the second image is reflected by the hot mirror to the second mirror, and further reflected by the second mirror to the camera.

2. The head-mounted display of claim 1, wherein the holder comprises a pair of goggles configured to seal off a space between the eyewear piece and a face of the user to prevent an ambient light from entering the space.

3. The head-mounted display of claim 1, wherein the reflective unit is configured to allow an infrared light to pass through and reflect a visible light or alternatively configured to allow the visible light to pass through and reflect the infrared light.

4. The head-mounted display of claim 1, further comprising:
    the mobile device comprising:
        a display unit;
        the camera configured to capture one or more optical images, the camera oriented to capture the images of the first eye reflected by the reflective unit;
        a light source configured to emit a light; and
        a processing unit configured to control operations of the display unit, the camera and the light source, the processing unit also configured to receive data associated with the captured one or more optical images from the camera, the processing unit further configured to render a visual image displayable by the display unit.

5. The head-mounted display of claim 4, wherein the light emitted by the light source comprises a visible light or an infrared light.

6. The head-mounted display of claim 4, wherein the mobile device further comprises a communication unit configured to at least transmit data to a remote computing device, and wherein the processing unit is further configured to provide data associated with the reflected images of the first eye to the remote computing device through the communication unit.

7. The head-mounted display of claim 4, wherein the mobile device further comprises a communication unit configured to at least transmit data to a remote computing device, and wherein the processing unit is further configured to perform operations comprising:
    analyzing the reflected image of the first eye to determine a gaze direction of the first eye; and
    providing data associated with the gaze direction to the remote computing device through the communication unit.

8. The head-mounted display of claim 4, wherein the processing unit is further configured to perform operations comprising:
    analyzing the reflected images of the first eye to determine a gaze direction of the first eye; and
    based on the gaze direction, rendering a revised visual image displayable by the display unit.

9. The head-mounted display of claim 4, wherein the processing unit is further configured to perform operations comprising:
    analyzing the reflected images of the first eye to determine a gaze direction of the first eye; and
    based on the gaze direction, performing foveated rendering.

10. The head-mounted display of claim 4, wherein the processing unit is further configured to perform operations comprising:
    analyzing the reflected images of the first eye to determine a behavior of the first eye which indicates a command for execution; and
    executing the command.

11. The head-mounted display of claim 10, wherein, in executing the command, the processing unit is configured to execute the command in a context of virtual reality (VR), and wherein the visual image comprises a VR image.

12. The head-mounted display of claim 10, wherein the behavior of the first eye comprises fixation, saccades and blinking.

13. The head-mounted display of claim 4, wherein the mobile device comprises a smartphone, a tablet computer, a phablet, or a portable computing device.

14. The head-mounted display of claim 4, further comprising:
a wide angle lens disposed in front of the camera such that an angle of a field of view of the camera through the wide angle lens is at least enough to cover an observation target of interest.

15. The head-mounted display of claim 4, further comprising:
a light guide coupled to the light source, the light guide configured to provide a point light in front of the at least one of the eyes of the user to produce a Purkinje image.

16. The head-mounted display of claim 15, wherein the camera is configured to sense the Purkinje image, and wherein the processing unit is configured to determine a location of a pupil of the first eye by tracking a movement of the Purkinje image.

17. The head-mounted display of claim 1, wherein the hot mirror is disposed between a display unit of the camera and the one or more lenses and also between the display unit and the reflective unit, and wherein the hot mirror is configured to reflect an infrared light while allowing a visible light to pass through.

18. The head-mounted display of claim 17, wherein the camera is configured to sense visible and near infrared reflections.

19. A head-mounted display, comprising:
an eyewear piece comprising:
a holder that is wearable by a user and configured to hold the mobile device in front of eyes of the user;
one or more lenses disposed between the eyes of the user and the mobile device so that through the one or more lenses a display unit of the mobile device is viewable by the user; and
a reflective unit configured to reflect at least double images of at least a first eye of the eyes of the user,
wherein the reflective unit comprises a first mirror, a second mirror and a third mirror,
wherein the first mirror is disposed between the first eye of the user and the one or more lenses,
wherein the second mirror is disposed on the holder and facing toward the mobile device and away from the user,
wherein the third mirror is disposed between the display unit of the mobile device and the one or more lenses,
wherein a first image is reflected to a camera of the mobile device by the first mirror, and
wherein a second image is reflected to the camera by the third mirror to the second mirror, and further reflected by the second mirror to the camera.

20. The head-mounted display of claim 19, wherein the third mirror comprises a hot mirror.

* * * * *